July 28, 1953     R. D. McLEOD     2,646,820
CONTROL VALVE

Filed Dec. 7, 1946     4 Sheets-Sheet 1

INVENTOR.
Roy D. McLeod
BY Barnes, Kisselle,
Laughlin & Raisch
ATTORNEYS

July 28, 1953     R. D. McLEOD     2,646,820
CONTROL VALVE
Filed Dec. 7, 1946     4 Sheets-Sheet 2
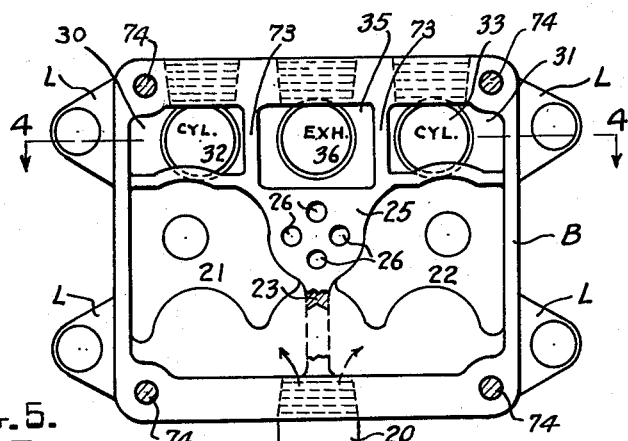
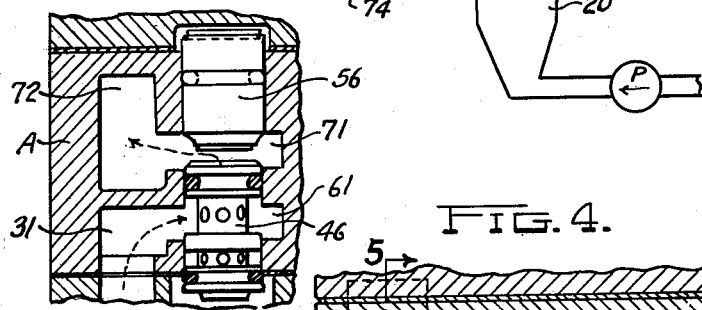
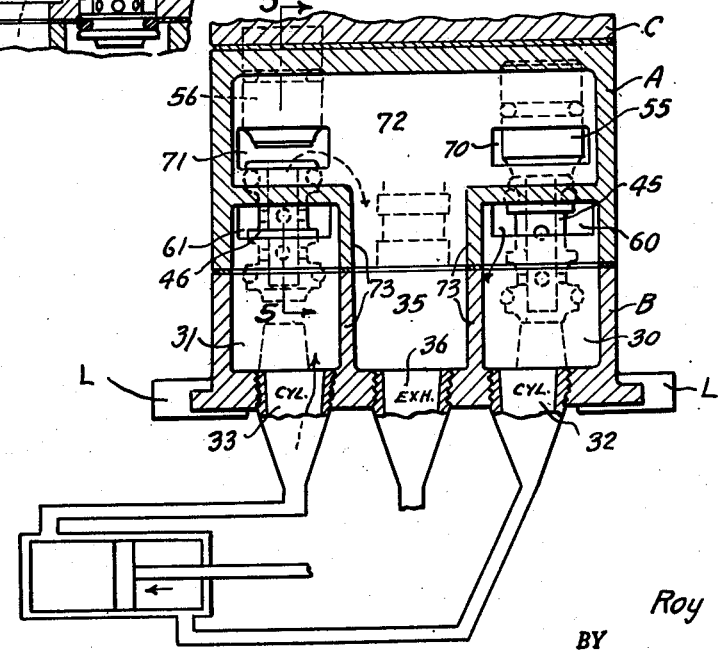
INVENTOR.
Roy D. McLeod
BY
Barnes, Kisselle, Laughlin
& Raisch
ATTORNEYS INVENTOR.
Roy D. McLeod
BY Barnes, Kisselle,
Laughlin & Raisch

ATTORNEYS

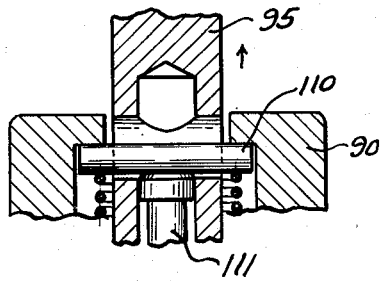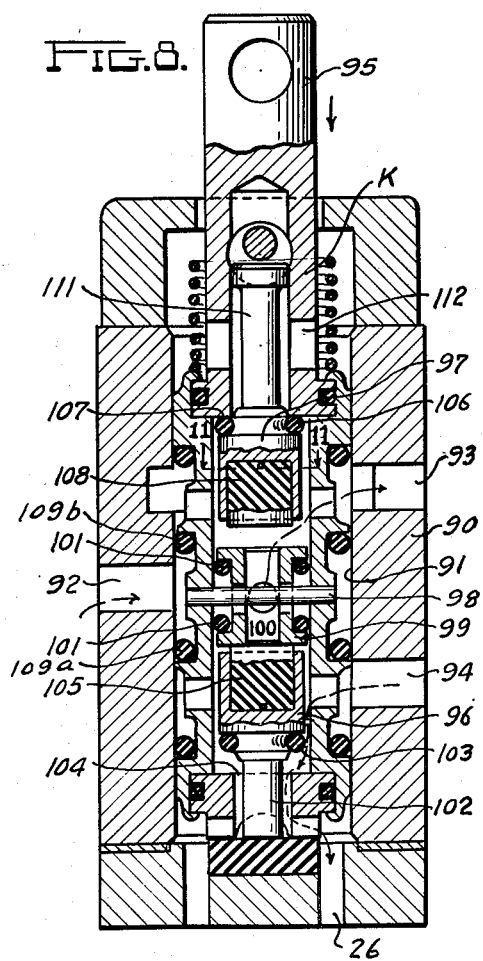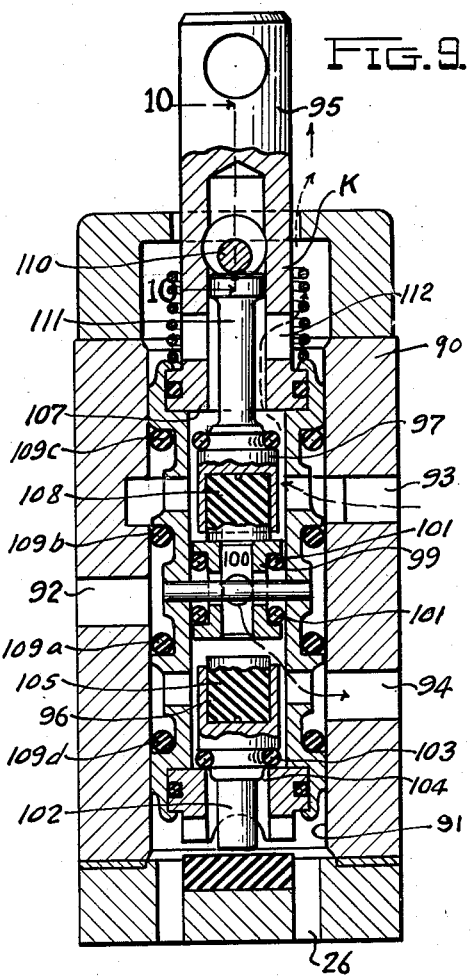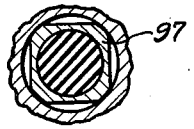

Patented July 28, 1953

2,646,820

UNITED STATES PATENT OFFICE 2,646,820

CONTROL VALVE

Roy D. McLeod, Detroit, Mich., assignor of two-thirds to William Carls, Milford, Mich., and one-third to Sophia Louise Brussel and Detroit Trust Company, coexecutors of Fred H. Brussel, deceased Application December 7, 1946, Serial No. 714,735

5 Claims. (Cl. 137—623)

This invention relates to a control valve for fluid pressure. It is an object of the invention to provide a self-contained valve in a single housing ready for attachment to air pressure and motor ports for the control of a fluid motor.

Another object is the provision of a valve housing readily adaptable to a single pressure or double pressure in the operation of a multiple port motor and a means for reversing the off-cycle pressure bias by changing the relative position of the valve housing parts.

A further object is a valve construction which will permit extremely rapid operation with a solenoid control, the parts being arranged to prevent any out-of-phase relation. This is accomplished by utilizing actuating pressure on only one control side in a cycle, the other control side of the valve being actuated by the escape air from the off-side of the actuated motor.

Additional objects are the reduction of total parts, elimination of packing, reduction of air travel through the valve, reduction in wearing parts, and elimination of springs.

Other objects will be apparent as the description progresses.

In the drawings, treating Figure 1 as a vertical position for the valve:

Figure 3 is a horizontal section on line 3—3 of Figure 1.

Figure 4 is a vertical section parallel with the section of Figure 1 but behind it and viewed from the rear in a direction shown by arrows on line 4—4 of Figure 3.

Figure 5 is a view of a partial vertical section on line 5—5 of Figure 4.

Figure 8 is a diagrammatic presentation of the central operating valve.

Figure 9 is a view similar to Figure 8 with parts in reverse actuation.

Figure 10 is a partial section on line 10—10 of Figure 9.

Figure 11 is a partial section on line 11—11 of Figure 8.

Figure 1:
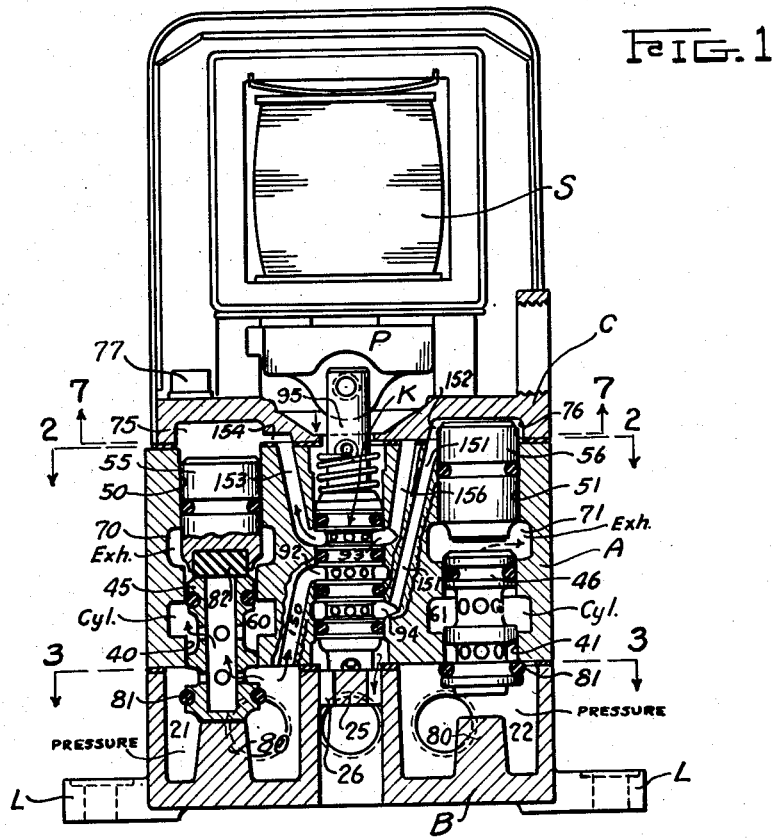
Figure 1 is a vertical section through the valve showing the operating valve parts.

To describe the general plan of the housing briefly, a main housing A rests on a base housing B and is covered by a closure housing C. As the assembly is viewed in Figure 1, the main housing A has three parallel valve bores, one in the center for a pilot control valve, and one on each side for actuating valves. Each side bore opens to a pressure chamber at the bottom in base B and to an operating chamber at the top in the portion C. In each side valve bore is a first chamber spaced from the bottom which can be called the cylinder chamber. Spaced upward in each side bore is an exhaust chamber. If reference is now made to Figure 4, it will be seen that the exhaust chambers are connected through a cored passage leading to an exhaust outlet in the base B. Each cylinder port leads downward to a cylinder outlet in the base B.

Now taking up the parts in more detail, the base B is a casting, as shown in plan in Figure 3, provided with an air inlet 20 leading to chambers 21 and 22 which, in operation, are connected to a constant source of fluid pressure. The septum or division wall 23 is originally cast into the housing between chambers 21 and 22. When chambers 21 and 22 are to be subject to the same pressure, the pressure inlet 20 is drilled into the housing to remove a portion of the septum 23, thus connecting chambers 21 and 22. When it is desired to subject chambers 21 and 22 to different pressures, separate taps will be made into each chamber leaving the septum 23 intact. See Figure 12. A central portion 25 in housing B serves as a bottom support for a control valve to be described later. It is ported at 26 for exhaust air. Base B has two cylinder chambers 30 and 31 with cylinder outlets 32 and 33 tapped in at the bottom. A central chamber 35 is for exhaust air and has a tapped outlet 36. The outlets in the chambers 30, 31, and 35 may be placed in the side of the housing if desired and the bottom ports plugged. Lugs L serve to hold the valve base in position.

The main housing A has two operating valve cylinders or bores, the lower ends of which may be represented by reference characters 40 and 41. The upper ends, which are of slightly larger diameter, are designated respectively 50 and 51. In the lower bores 40 and 41 are slidable poppets 45 and 46. In the upper bores 50 and 51 are slidable poppets 55 and 56. In bores 40 and 41 are ports 60 and 61, respectively, spaced upwardly from the bottom of the bores. These are cylinder ports which connect to chambers 30 and 31 as shown in Figure. 4. In the larger bores 50 and 51 are ports 70 and 71 which are exhaust ports connecting to a cored passage 72 leading downward to form a T-shaped chamber with the exhaust passage 35 of the base B, Figure 4. In housings A and B, septum walls 73 separate the T-shaped chamber 72—35 from cylinder outlet chambers 30, 31. Bolts 74 hold housing A on the base B. Thus the chambers 30, 31 lie directly below the bar of the T of the exhaust chamber.

Figure 7:
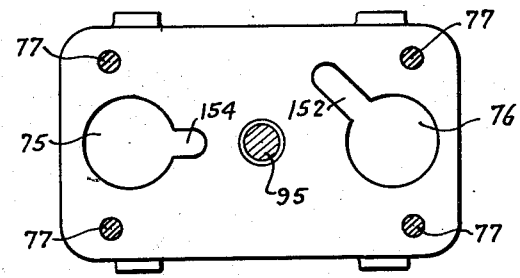
Figure 7 is a horizontal section on line 7—7 of Figure 1 viewing the bottom surface of the top closure housing.

The cover plate C is provided with two ports or chambers 75 and 76 aligned with bores 50 and 51, Figures 1 and 7. These chambers 75 and 76 may be called operating chambers since they receive air under pressure to actuate poppets 55 or 56. Also supported on the cover plate C is a solenoid S having a plunger P which actuates the stem of a control valve K slidably mounted in a central bore of the housing A. Bolts 77 hold housing C in place on housing A.

Figure 6:
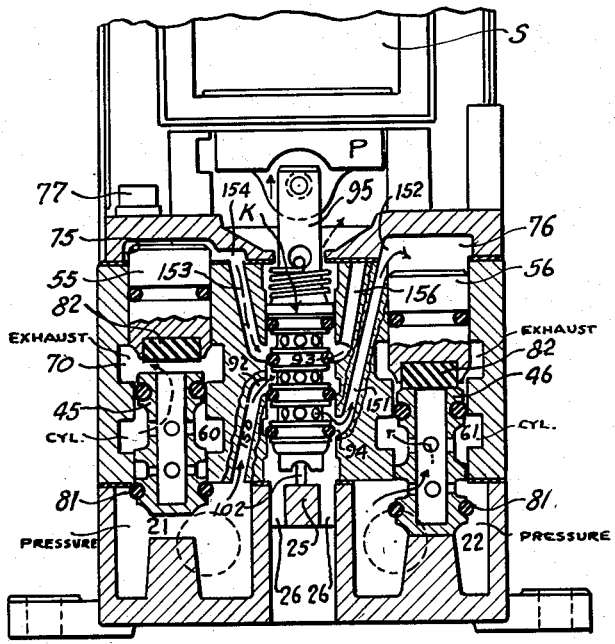
Figure 6 is a view similar to Figure 1 with the parts in reverse actuation.

The poppets 45 and 46 are shiftable to an open position where they rest on a small pedestal 80 in base B, and to a top closed position where a neoprene ring 81 serves to seal the valve bore from the pressure chamber in the base. These lower poppets are spool shaped and have guiding portions for the valve bore; each has an axial passage and is provided with side ports to permit air to pass through it from pressure chambers 21 and 22 to the ports 60 and 61 when in the open position, and from pressure chambers 60 and 61 to exhaust chambers 70 and 71 when in the upper or closed position. The slidable poppets 55 and 56 in the larger bores 50 and 51 each have a neoprene disc 82 in the lower face to cooperate with the poppets 45 and 46 to close the axial passages of the latter poppets as shown in Figures 1 and 6.

Thus far there has been described a control valve for a double ended motor commonly called a 4-way valve. With the parts shown in the position of Figure 1, pressure can pass from chamber 21, as shown by the solid arrows, to the cylinder port 60 and out through the passages 30 and 32 of base B to one end of a motor. Meanwhile, exhaust air in the other end of an operated motor will enter passages 33 and 31 of base B as shown by the dotted arrows and pass to port 61 where it enters the axial passage of poppet 46 leading to port 71 and the exhaust passages 72 and 35, Figure 4. When the parts are in the reverse position, a reverse action will take place as illustrated by the solid arrows showing pressure and the dotted arrows showing exhaust flow in Figure 6.

The valve assembly above described for purposes of illustration is a pilot-operated valve, although it could be a manually-operated valve. In the pilot operation, the valve K previously referred to as actuated by solenoid S, serves to direct pressure selectively to actuating chambers 75 or 76 where it acts on the top surfaces of poppets 55 or 56 to shift them downwardly, thus causing actuation of the respective poppets 45 or 46 below the actuated poppet. Since poppets 55 and 56 are larger in effective diameter than poppets 45 and 46, this movement will take place against the pressure in chambers 21 or 22. The valve K is shown in full section in Figures 8 and 9 where a diagrammatic view of the housing is presented to facilitate explanation. The housing 90 has a straight cylindrical bore 91 with a side-pressure, inlet opening 92 and two operating ports 93 and 94. A valve spool having suitable guiding lands is fitted in the bore 91 and is provided with a central bore extending from the bottom upward into the operating stem 95. Within the central bore of valve K are two square-sectioned plungers 96 and 97 (Figure 11) one at each end of the bore, and between them, mounted with lost motion on a pin 98, is a small spool 99 provided with an axial passage 100. Neoprene rings 101 serve to provide a sliding seal around the spool 99. A stem 102 on the bottom of plunger 96 limits its downward movement and consequently when valve K is shifted downwardly as shown in Figure 8, a neoprene ring 103 is lifted away from a port opening 104 and a neoprene insert 105 may contact the lower end of spool 99 to close the axial passage 100. Meanwhile, with the valve K in its down position, the stem 111 on plunger 97 is freed to permit neoprene ring 106 to shift against a seat 107 in a manner to be later described to close the top axial passage. A neoprene insert 108 in plunger 97 is thus spaced from the upper end of passage 100 in spool 99 permitting pilot air to pass from an inlet 92 through side ports in valve K between neoprene rings 109a and 109b and through side ports in spool 99 between rings 101 to an operating outlet 93. Ring 109c seals the upper land of valve K.

In the reverse position when stem 95 is moved upward by the solenoid, a pin 110 shown in Figure 10 extending transversely through stem 95, serves as an upper limit stop for stem 111 on plunger 97. This moves the neoprene ring 106 away from the seat 107 and permits exhaust air to pass from port 93 around plunger 97, which has a cross section as shown at Figure 11, to an outlet port 112 in stem 95 and thence around the stem to atmosphere. Meanwhile, pilot air has entered the central passage 100 of spool 99 and passes down around plunger 96 to outlet 94, the neoprene ring 103 being seated against the port opening 104. Ring 109d seals the lower land of valve K.

Actually, in operation, the pressure from the inlet port 92 accomplishes the sealing between the stems 96 and 97 and the respective ends of spool 99. The shifting of the stem 95 opens either port 104 or port 107. The rush of air under pressure toward such open port immediately tends to force the spool 99 against the particular plunger which is held open, and the other plunger is forced by pressure to a closed position. Thus the mechanical movement simply serves to open one plunger and the air does the rest of the operating of the valve. This makes for the very rapid change of part position which is possible when the solenoid is operated at hundreds of cycles a minute. Furthermore, a valve K need be moved only a fraction of an inch to be effective. Consequently the solenoid travel is small. A distance of 1/8" or less is sufficient.

The valve K shown in Figures 1 and 6 is identical with that shown in Figures 8 and 9. Pressure is supplied through a passage 150 leading from pressure chamber 21. Port 92 feeds the valve as in Figure 8 and ports 93 and 94 are respectively positioned. Port 94 connects with a passage 151 in housing A leading to a passage 152 and the chamber 76 of housing C. Port 93 connects with a passage 153 which leads to a passage 154 in housing C and the chamber 75. Passage 153 has a diametrically opposed symmetrical passage 156 which has a blind end in Figure 1; the function of passage 156 will be explained later.

Taking up now the operation of the entire unit, when the solenoid is de-energized, the weight of the plunger P will carry valve K down to the position of Figure 1. Pressure from chamber 21 will follow passage 150 to port 92 where it is directed by valve K in the position of Figure 8 to port 93 and passages 153, 154 to chamber 75 where it exerts pressure on the top of poppet 55 and moves this poppet and the poppet 45 to the down position. Pressure can then pass from chamber 21 to cylinder port 60 as previously described. When the solenoid is energized, valve K will be moved up to the position shown in Figures 6 and 9 and then pressure from chamber 21 follows passage 150 to port 92 and is distributed by valve K to port 94 and passage 151, 152 to chamber 76. This will shift the right-hand assembly as shown in Figure 6 downward.

Meanwhile pressure from the cylinder port 60, which is connected to the exhaust end of a double ported motor, will explode into the valve passing into the axial chamber of poppet 45, and being of sufficient force to split the poppets 45 and 55 will permit the exhaust pressure to go to port 70 and out of the valve through passages 72 and 35. Pressure on the top of poppet 55 is, of course, relieved through valve K so that this action may take place. Poppet 45 is moved upward by pressure in chamber 21 to close that chamber as soon as pressure on the top of poppet 55 is relieved.

It will be seen that only one side of the valve is actuated by live pressure at any one time as distinguished from some pilot-operated valves in which one control side is actuated in one direction while the other control side is actuated in the reverse direction. In the applicant's design, there is no possibility of out-of-phase movement in rapid operation since the exhaust air from the motor actually finds its own way out of the valve by shifting the parts on the exhaust side. It will be seen further that a very small amount of pilot air can control the relatively large size poppets and that the entire unit is adaptable to rapid operation.

Figure 12:
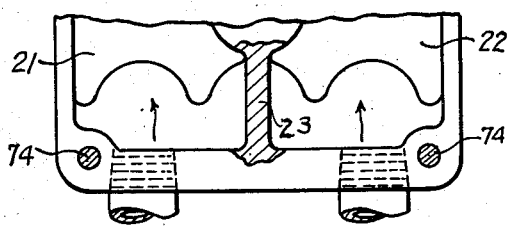
Figure 12 is a plan view of a portion of the housing comparable to Figure 3 showing a variation in form.

A further feature of the construction ties in with the showing of Figure 12 where two separate inlet ports for pressure are disclosed to chambers 21 and 22. In some operations, it is desirable to use two different pressures on a motor —one pressure at one end and one pressure at another. Applicant can produce this effect by using the double ported base shown in Figure 12 with the separated pressure chambers. High pressure is always put in the left-hand chamber so that it will feed to passage 150 of the pilot valve.

Figure 2:
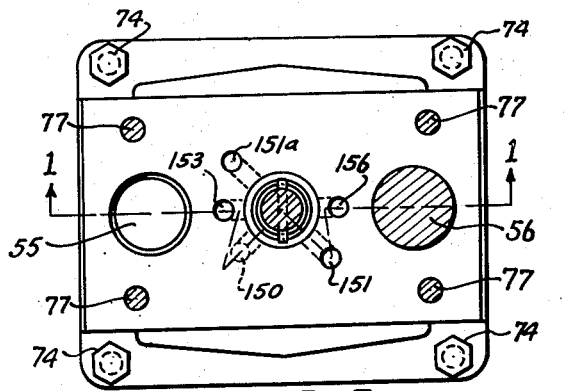
Figure 2 is a horizontal section on line 2—2 of Figure 1.

When the parts are as shown in Figure 1, during the off-cycle of the solenoid when valve K is down, pressure is directed to cylinder port 60. If it is desired that this off-cycle pressure be directed to the other cylinder port 61, the housing C may be switched 180° from the position shown in Figure 1. If reference is made to Figures 2 and 7, it will be seen that the passage 152 coincides with the end of passage 151 when the parts are assembled and passage 153 registers with passage 154. The symmetrical passage 156 has been described with reference to passage 153. A passage 151a symmetrical with passage 151 is also shown in Figure 2. If the housing shown in Figure 7 is shifted 180°, then passage 152 will register with passage 151a and passage 154 will register with passage 156. Since passage 153 will then have a blind end, the pressure directed through valve K in the at-rest position will then go to chamber 76 instead of 75 and the valve will be actuated in reverse, the passage 151a assuming the function previously performed by passage 151.

Reference is made to my copending application, Serial No. 714,736, filed December 7, 1946, now Patent No. 2,588,552, granted March 11, 1952, which discloses and claims the valve shown in Figure 8 of this disclosure.

What I claim is:

1. A valve and housing combination comprising a mounting base to which all pipe connections will be made, said base comprising a block having three spaced chambers extending across one side of the block defined by septum walls extending transversely of the block, and accessible for pipe connections from a side wall and bottom wall of the block, a pressure chamber formed in the remainder of the block accessible for pipe connections from side walls and the bottom of the block, a four-way control valve housing associated with said base comprising a body having a T-shaped exhaust chamber opening at the stem of the T to the central chamber of the three spaced chambers of the base, cylinder chambers formed below the bar of the T-shaped chamber on either side of the stem lying in registration with the end two chambers of the three spaced chambers in the base, valve bores in said body on either side thereof and ports formed in the walls of said exhaust chamber and said cylinder chambers to connect to said valve bores, said valve bores extending to said pressure chamber in the base block, and means removably connecting said block and housing in air-tight relation whereby cylindrical valve means in said bores may selectively connect said cylinder and exhaust chambers and said pressure and cylinder chambers.

2. A valve and housing combination as defined in claim 1 in which additional valve bore centrally of the valve housing houses a control valve to direct actuating pressure to the control valve bores to shift valves in said bores to the selective positions, passages being formed in said housing to direct pressure from the block base to the additional bore and thence to the respective control valve bores.

3. A valve and housing as defined in claim 2 in which a raised island portion in the pressure chamber is positioned below the additional valve bore to provide an exhaust outlet for said additional bore and a supporting stop for a valve in said additional bore.

4. A fluid control valve comprising a housing having a cylindrical bore and having formed in the walls of said bore three enlarged, spaced ports to create between said ports two internal lands, said ports comprising respectively a pressure port, an operating port and an exhaust port in that order along said bore, an operating valve movable axially from one extreme position to another in said bore having three spaced, external lands, two of which, adjacent one end, are slidable in sealing relation with said internal lands of said bore, and the third land, located within said pressure port, serving in one position to seal said pressure port from said cylinder port, said valve having an open center passage leading to one end of the bore opposite the pressure port and communicating with the walls of said valve between said external lands, said passage serving to connect an adjacent pair of said spaced ports alternately and selectively in the two positions of the valve, an operating member in the end of said bore opposite said pressure port axially shiftable in sealing relation within said bore, and a resilient insert in said operating member at the valve end thereof to contact the open end of said operating valve member to close the same while shifting the valve member to one of its positions, the valve being shiftable to and maintained in the other of its positions by pressure in said pressure port.

5. A combination as defined in claim 4 in which a resilient O-ring surrounds the pressure port land of said valve to serve as a shock absorber and seal for said valve as it moves to close the pressure port from the cylinder port.

ROY D. McLEOD.

References Cited in the file of this patent

UNITED STATES PATENTS

| Number | Name | Date |
| --- | --- | --- |
| 1,595,458 | Doolittle | Aug. 10, 1926 |
| 1,778,757 | Forker | Oct. 21, 1930 |
| 2,097,201 | Renkenberger | Oct. 26, 1937 |
| 2,200,824 | Herman | May 14, 1940 |
| 2,211,319 | Camerota | Aug. 13, 1940 |
| 2,218,861 | Stumpf | Oct. 22, 1940 |
| 2,275,963 | Herman | Mar. 10, 1942 |
| 2,320,763 | Trautman | June 1, 1943 |
| 2,393,076 | Van Der Werff | Jan. 15, 1946 |
| 2,404,514 | McClure | July 23, 1946 |

FOREIGN PATENTS

| Number | Country | Date |
| --- | --- | --- |
| 144,377 | Switzerland | of 1931 |